United States Patent [19]
Hertzmann et al.

[11] Patent Number: 6,011,536
[45] Date of Patent: Jan. 4, 2000

[54] METHOD AND SYSTEM FOR GENERATING AN IMAGE HAVING A HAND-PAINTED APPEARANCE

[75] Inventors: Aaron P. Hertzmann; Kenneth Perlin, both of New York, N.Y.

[73] Assignee: New York University, New York, N.Y.

[21] Appl. No.: 09/083,401

[22] Filed: May 22, 1998

Related U.S. Application Data

[60] Provisional application No. 60/082,245, Apr. 17, 1998.

[51] Int. Cl.$^7$ ........................................................ G09G 5/00
[52] U.S. Cl. ............................................ 345/112; 345/156
[58] Field of Search .................................... 345/112, 156, 345/419, 431

[56] References Cited

U.S. PATENT DOCUMENTS

| | | | |
|---|---|---|---|
| 4,633,416 | 12/1986 | Walker | 345/156 |
| 4,956,872 | 9/1990 | Kimura . | |
| 5,038,223 | 8/1991 | Yamada . | |
| 5,063,448 | 11/1991 | Jaffray et al. . | |
| 5,276,786 | 1/1994 | Long et al. | 345/428 |
| 5,301,136 | 4/1994 | McMillan, Jr. et al. . | |
| 5,384,912 | 1/1995 | Ogrinc et al. | 345/523 |
| 5,412,767 | 5/1995 | Long . | |
| 5,500,925 | 3/1996 | Tolson . | |
| 5,621,868 | 4/1997 | Mizutani et al. . | |
| 5,687,304 | 11/1997 | Kiss . | |

OTHER PUBLICATIONS

"Multiresolution Painting and Compositing", Deborah F. Berman, Jason T. Bartell, David H. Salesin, SIGGRAPH 94 Conference Proceedings, pp. 85–90,Jul. 1994.

"The Further Exploits of Aaron, Painter" Harold Cohen, Stanford Humanities Review, vol. 4, No. 2.,pp. 141–158, 1995.

"Computer–Generated Watercolor", Cassidy J. Curtis, Sean E. Anderson, Joshua E. Seims, Kurt W. Fleischer, Dvid H. Salesin, SIGGRAPH 97 Conference Proceedings, pp. 421–430,Aug. 1997.

"Paint By Numbers: Abstract Image Representations", Paul Haeberli, Computer Graphics, pp. 207–214, vol. 24, No. 4, Aug. 1990.

"Expressive Rendering: A Reivew of Nonphotorealistic Techniques", John Lansdown, Simon Schofield, IEEE Computer Graphics and Applciations, 15(3):29–37, 12 pages, May 1995.

"Processing Images and Video for An Impresionist Effect", Peter Litwinowicz, SIGGRAPH 97 Conference Proceedings, pp. 407–414, Aug. 1997.

"Real–Time Nonphotorealistic Rendering", Lee Markosian, Michael A. Kowalski, Samueal J. Trychin, Lubomir D. Bourdev, Danieal Goldstein, John F. Hughes, SIGGRAPH 97 Conference Proceedings, pp. 415–420,Jul. 1997.

"Live Paint: Painting with Procedural Multiscale Textures", Ken Perlin, Computer Graphics Proceedings, Annual Conference Series, pp. 153–160,1995.

(List continued on next page.)

*Primary Examiner*—Richard A. Hjerpe
*Assistant Examiner*—Ronald Laneau
*Attorney, Agent, or Firm*—Kenyon & Kenyon

[57] ABSTRACT

A method and system receives a digital source image and brush size data. The source image is blurred to generate a digital reference image. The brush size data includes a first record corresponding to a first size of a brush and a second record corresponding to a second size of the brush. The first size is different from the second size. The method and system applies brush strokes, with the first record to be used for the brush, to a digital canvas image using the reference image. Then the brush strokes are applied, with the second record to be used for the brush, to the canvas image using the reference and working images. Thus, a final digital image having a hand-painted appearance is generated on the canvas image. Long curved brush strokes can also be used to generate the target image, which is aligned in a normal direction to image gradients. Furthermore the graphic artist may adjust parameters of the method and system according to the present invention to vary the style of painting.

28 Claims, 10 Drawing Sheets

OTHER PUBLICATIONS

"Orientable Textures for Image–Based Pen–and–Ink Illustration", Michael P. Salisbury, Michael T. Wong, John F. Hughes, David H. Salesin, SIGGRAPH 97 Conference Proceedings, pp. 401–406,Aug. 1994.

"Statistical Techniques for the Automated Synthesis of Non–Photorealistic Images" S.M.F. Treavett and M. Chen, Proc. 15th Eurographics UK Conference, 10 pages, Mar. 1997.

"Image–Guided Streamline Placement", Greg Turk, SIGGRAPH 96 Conference Proceedings, pp. 453–460,Aug. 1996.

"Efficient and Reliable Schemes for Nonlinear Diffusion Filtering", Joachim Weickert, Bart M. ter Haar Romeny, Max A. Viergever, IEEE Transactions on Image Processing, vol. 7, No. 3, pp. 398–410,Mar. 1998.

"Computer–Generated Pen–and–Ink Illustration", Georges Winkenbach, David H. Salesin, Computer Graphics Proceedings, Annual Conference Series, pp. 91–100, 1994.

"Rendering Parametric Surfaces in Pen and Ink", Georges Winkenbach, David H. Salesin, SIGGRAPH 96 Conference Proceedings, pp. 469–476,Aug. 1996.

6,011,536

METHOD AND SYSTEM FOR GENERATING AN IMAGE HAVING A HAND-PAINTED APPEARANCE

This application claims benefit of provisional application 60/082245 filed Apr. 17, 1998.

FIELD OF THE INVENTION

The present invention relates to a method and system for generating an image having a hand-painted appearance. In particular, the generated image is created by repeatedly applying a series of spline brush strokes on a source image.

BACKGROUND INFORMATION

In the past, artistic illustrations have been solely created by skilled artists and creative individuals willing to devote considerable time and resources to the creation of such artistic illustrations. Current developments in a computer technology now enables a relatively quick and easy creation of photo realistic images. Accordingly, it is possible to automate details of photo realistic rendering. Such rendering processes are generally controlled by a human user selecting scenes and rendering parameters.

However, conventional processes and systems do not produce very good non-photo realistic works (i.e., paintings and drawings) having a hand-painted appearance in a fully automated manner. In particular, the human user utilizing these conventional processes and systems must interactively "paint" the entire image using a paint program or process an image or 3D model through a narrowly-defined set of non-photo realistic filters.

Some conventional methods and systems for processing an image do not produce images having non-photo realistic aspects. For example, these conventional processes and systems use very simple brush strokes, all of which have equal sizes and shapes. In contrast to hand-drawn paintings, the resulting images produced by these conventional processes and systems have mechanical and computer-generated appearance.

Thus, there is a need to overcome these disadvantages and provide a method and a system which produce non-photo realistic images without having the disadvantageous mechanical aspects.

SUMMARY OF THE INVENTION

A method and system according to the present invention provides a computer system to generate a digital image having a hand-painted appearance on a canvas image. This method and system receive a source image and brush size data. The source image is blurred to generate a reference image. The brush size data include a first record corresponding to a first size of a brush and a second record corresponding to a second size of the brush, the first size being different from the second size. The computer system operates to simulate brush strokes which are applied, with the first record to be used for the brush, to the canvas image using the reference image. The brush strokes are then applied, with the second record to be used for the brush, to the canvas image using the reference and canvas images. In this manner, an image having a hand-painted appearance is generated.

Thus, the target image is generated using a series of layers, starting with a rough sketch drawn, e.g., with a brush having a large size. The sketch is painted over with progressively smaller brushes, preferably in areas where the sketch differs from the blurred source image. Therefore, the visual emphasis in the painting corresponds approximately to the spatial energy present in the source image.

In another exemplary embodiment of the present invention, long curved brush strokes can be used to generate the target image, which is aligned in a normal direction to image gradients.

Furthermore the graphic artist may adjust parameters of the method and system according to the present invention to vary the style of painting.

DETAILED DESCRIPTION

Overall System Architecture

Figure 1:
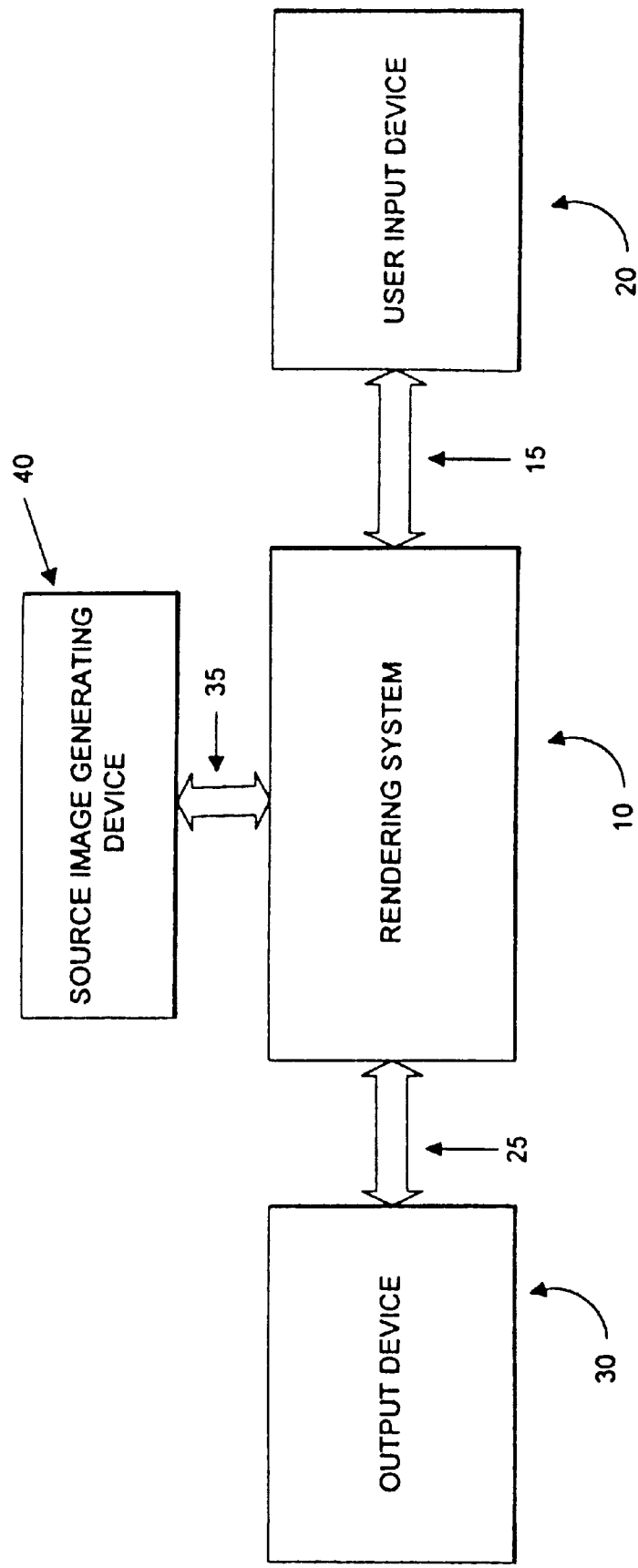
FIG. 1 shows an overall system architecture of an exemplary embodiment of the system according to the present invention

FIG. 1 shows an overall system architecture of an exemplary embodiment of the system according to the present invention. A user input device 20, an output device 30 and a source image arrangement 40 are coupled to a rendering system 10. The user input device 20 may include, e.g., a keyboard, a mouse and a voice command system, and is connected to the rendering system 10 via a first communication arrangement 15. The output device 30 may include, e.g., a monitor or a printer, and is connected to the rendering system 10 via a second communication arrangement 25. The source image arrangement 40 may include, e.g., a scanner, a storage arrangement maintaining stored images (such as a CD-ROM drive) and/or an Internet server storing source images. The source image arrangement 40 is connected to the rendering system 10 via a third communication arrangement 35. Each of the communication arrangements 15, 25, 35 may include, for example, a serial communication line, a parallel communication line, a fiber-optic communications network, etc. In addition, it is possible for the source image arrangement 40 to be incorporated into the rendering system 10.

The rendering system 10 may be connected to other rendering systems and/or to further systems (not shown) via a communication network and/or to telephone lines (not shown).

Message Delivery System

Figure 2:
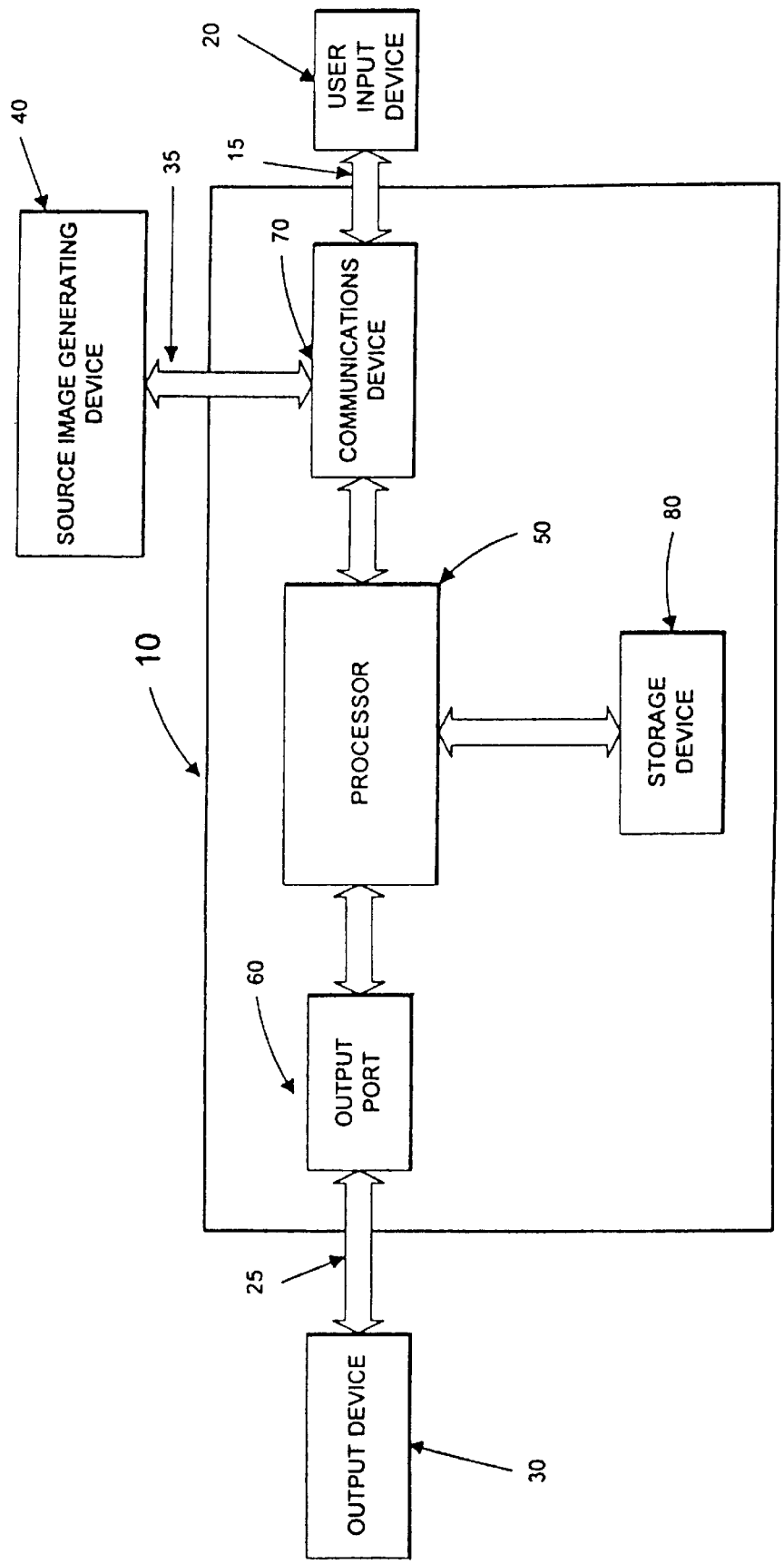
FIG. 2 shows an exemplary rendering system of FIG. 1 according to the present invention in further detail.

FIG. 2 shows the exemplary rendering system 10 according to the present invention in further detail. In particular, the exemplary rendering system 10 may include, for example, a processor 50. The processor 50 is coupled to a communications device 70 (e.g., a communications port such as SCSI port, a serial port, etc.), to an output port 60 (e.g., a monitor port, an LPT port, etc.) and to a storage device 80 (e.g., a RAM arrangement, a ROM arrangement, a disk drive, etc.). The processor 50 may include, for example, a high performance microprocessor, a minicomputer, a mainframe computer, or even a network of processors (which are commercially available). It should be noted that the output port 60, the communications device 70 and the storage device 80 are all commercially available.

The communications device 70 is preferably coupled to the source image arrangement 40 for receiving source images therefrom. In addition, the communications device 70 can be coupled to the user input device 20 for receiving user instructions therefrom. The communications device 70 can also be coupled to a communications network for communicating between other processors and/or systems. Such communications network may include analog telephone lines, digital telephone lines, an Ethernet network, T1/T3 communication arrangements, etc.

The source image may also be stored in the storage device 80, and therefore would be provided to the processor 50 during the execution of the method according to the present invention. As such, the rendering system 10 would be able to obtain the source image from the storage device 80 without utilizing the source image arrangement 40.

For displaying a processed image, the output device 30 is coupled to the output port 60 so that the image data may be provided from the output port 60 by the processor 50 and/or by the storage device 80.

In accordance with the present invention, the processor 50 controls the communications device 70, the storage device 80 and the output port 60 to receive, store and/or display the source images and to display the processed (e.g., final) image.

Overview Of Operation

Figure 3:
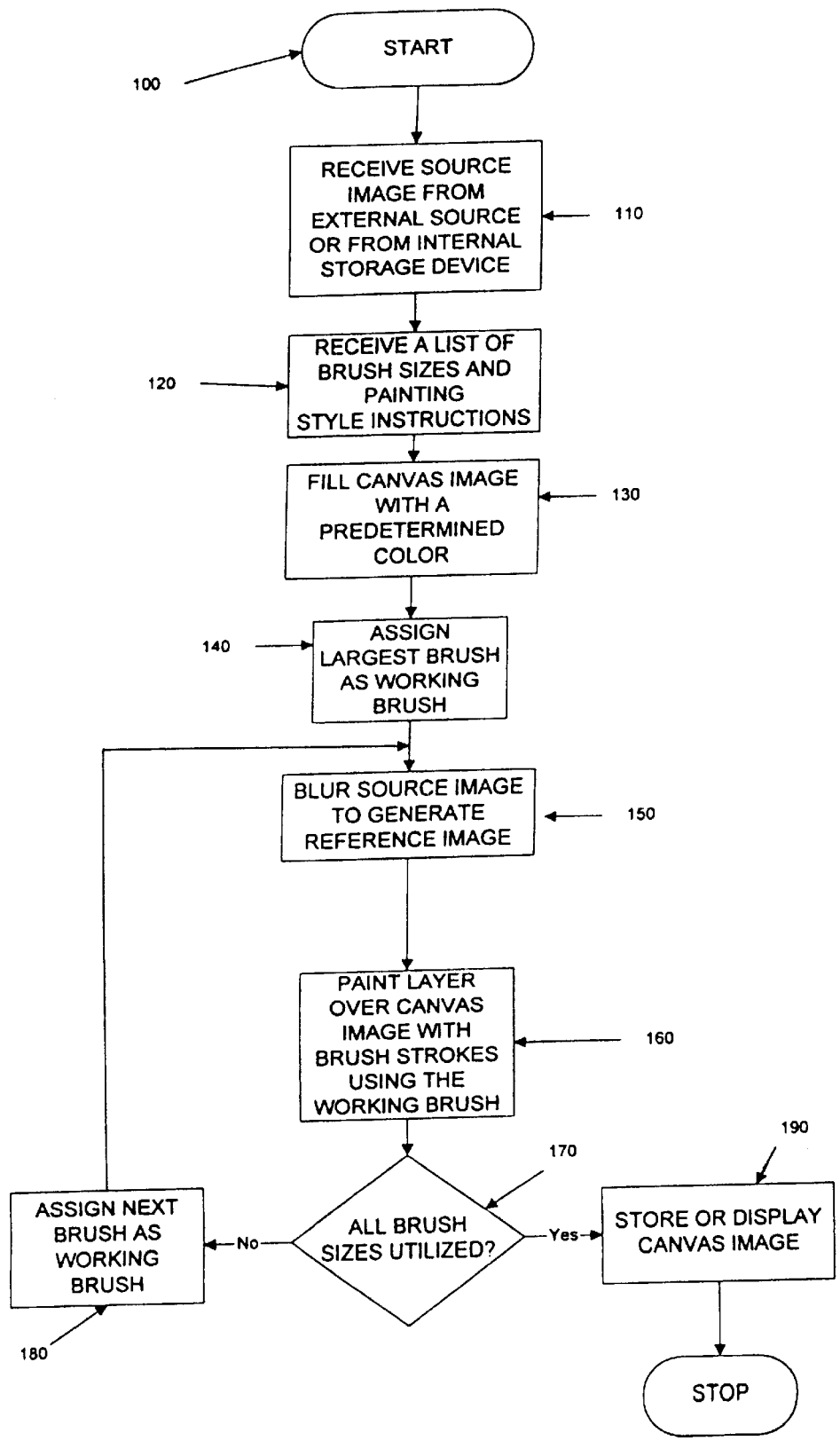
FIG. 3 shows a general flow diagram of an exemplary embodiment of the method according to the present invention performed by the system according to the present invention.

FIG. 3 shows a general flow diagram of a method according to the present invention performed by the rendering system 10 described above. In particular, the method according to the present invention is initiated in step 100. The rendering system 10 receives the source image (step 110). The source image represents the image that would be approximated by a painting. As described above, the source image is provided to the processor 50 by the source generating arrangement 40 and/or by the storage device 80 which may already have the source image stored thereon. Other systems and/or devices may provide the source image to the processor 50. In step 120, the processor 50 receives a list of usable brush sizes and painting style instructions (e.g., data records) from the storage device 80 or from another source. The brush sizes and/or style can also be provided by a user via the user input device 20. In step 130, the processor fills a canvas image (e.g., image to be worked on) with a predetermined color. Then, in step 140, the processor 50 selects a largest brush size from the list of usable brush sizes to be used as a working brush ($R_i$).

Thereafter, the processor 50 digitally blurs the source image to generate a reference image (step 150). The source image may be preferably blurred using a convolution with a Gaussian kernel of standard deviation $f_o * R_i$, where $f_o$ is a constant factor and $R_i$ is the working brush size. Non-linear diffusion may also be used instead of the Gaussian blur to produce slightly better results near edges. Other standard blurring techniques can also be used. In step 160, the processor 50 executes instructions to paint the canvas image with the working brush using brush strokes. An embodiment of the method according to the present invention to paint the canvas image will be described below in further detail. The canvas image is painted over using the working brush ($R_i$), based on the reference image (i.e., the blurred source image).

If all the brush sizes have not yet been utilized (step 170), the processor 50 assigns the next largest brush sized to be used for the working brush (step 180), blurs the source image to produce the reference image (step 150) and paints the canvas image again using the new working brush (i.e., returns to step 160). Each brush, preferably, captures only details which are at least as large as the size of the working brush currently used. If all the brush sizes have been utilized (step 170), the processor 50 stores the painted canvas image in the storage device 80 and/or displays the painted canvas image on the output device 30 via the output port 60 (step 190) and completes the execution of the method according to the present invention. The following is an exemplary pseudocode for the general method according to the present invention described above:

```
function paint(sourceImage, R₁ . . . Rₙ)
{
    canvas := a new constant color image
    // paint the canvas
    for each brush radius Rᵢ,
        from largest to smallest do
    {
        // apply Gaussian blur
        referenceImage = sourceImage * G(fo Ri)
        // paint a layer
        paintLayer(canvas, referenceImage, Rᵢ)
    }
    return canvas
}
```

Figure 4A:
FIG. 4(a) shows a digital source image to be used as a reference image.
Figure 4B:
FIG. 4(b) shows a digital canvas image after brush strokes having a largest supplied radius is applied on the canvas image.
Figure 4C:
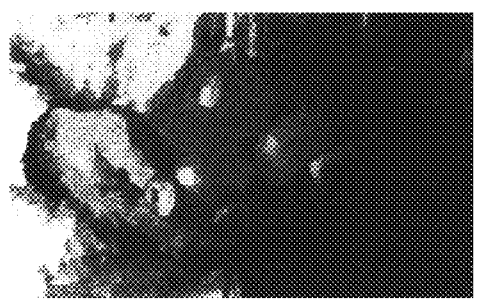
FIG. 4(c) shows the digital canvas image of FIG. 4(b) after brush strokes having a smaller supplied radius are applied on the canvas image.
Figure 4D:
FIG. 4(d) shows the digital canvas image of FIG. 4(c) after the brush stroke having yet smaller supplied radius are applied on the canvas image.

FIGS. 4(b)–4(d) show a progression of the canvas image which uses the source image illustrated in FIG. 4(a). In particular, the canvas image is displayed in FIG. 4(b) after a first layer is digitally painted using a brush radius of 8 pixels (e.g., 8 mm). FIG. 4(c) shows the canvas image after being digitally painted over with the brush strokes, in which a brush having a radius of 4 pixels (e.g., 4 mm) is used.

FIG. 4(d) illustrates the final canvas image after being digitally painted over with brush strokes, in which a brush having a radius of 2 pixels (e.g., 2 mm) is used. It should be noted that the brush strokes of each size are still visible in FIG. 4(d).

Figure 4E:
FIG. 4(e) shows an exemplary illustration of a painting.

FIG. 4(e) shows an exemplary illustration painted by Degas in 1876. It should be noted that a different character of painting strokes were used by the artist to depict a blouse, sand, children, boat and sky shown in this painting. In particular, each of these features were painted using brushes having different brush sizes, in addition to being painted using different stroke styles. This drawing illustrates that a variation in stroke quality helps to draw more attention to the woman and figures, while very little attention is drawn to the ground. Thus, the painter uses fine strokes to draw our attention to fine detail. Using this painting as a basis, the system and method of the present invention utilizes fine brush strokes which are used only where necessary to refine the painting, and leave the rest of the painting alone. Thus, an initial coarse approximation is painted on the canvas image, and then progressive refinements with smaller and smaller brushes are added thereto.

Figure 5:
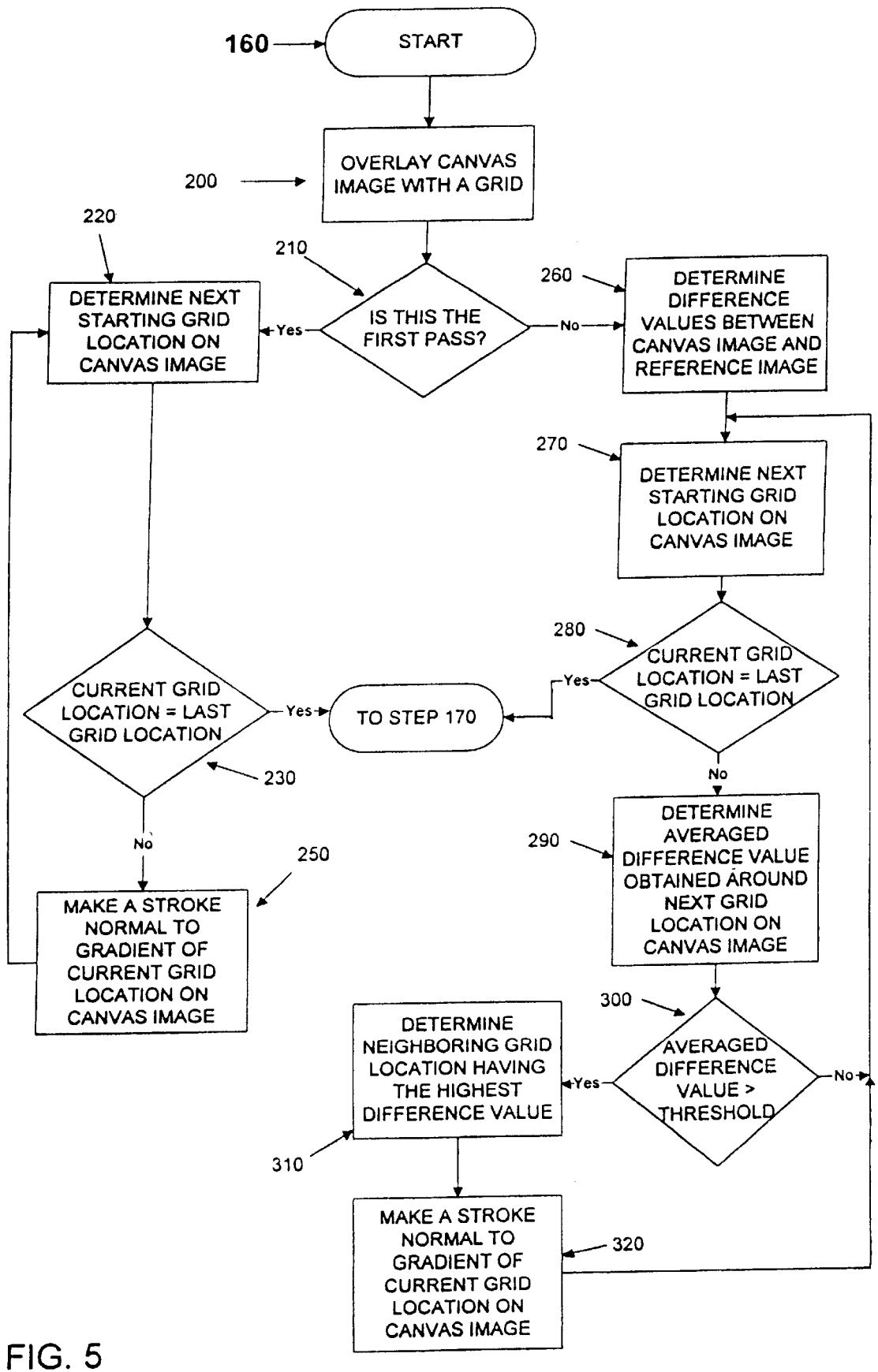
FIG. 5 shows an exemplary embodiment of the method according to the present invention for painting a digital canvas image with a computer generated brush.

FIG. 5 shows an exemplary embodiment of a method according to the present invention for painting the canvas image with the working brush (i.e., detailing step 160 described above). In particular, the processor 50 cooperates the canvas image (e.g., overlays) with a grid (step 200). In step 210, if the working brush is the largest brush selected from a list of usable brush sizes (i.e., entering first pass over the canvas image), the processor performs steps 220–250. In step 220, a first grid location on the canvas image is determined (the next grid location is determined if the first grid location was previously determined). Then, in step 230, the processor 50 determines if the current grid location is equal to the last grid location. If so, the processor 50 returns the execution to step 170 as illustrated in FIG. 3. If not, the processor 50 executes commands to make a stroke which is normal to the gradient of the current grid location on the canvas image (step 250) (e.g., to draw a long, curved brush stroke) and the processor 50 returns the execution to step 220 where the next working grid location on the canvas image is determined and steps 230–250 are executed again.

If, in step 210, the next brush does not have the largest brush size (e.g., not entering the first pass), the processor 50 (in step 260) determines the difference (e.g., creating a difference image) between the canvas image and the reference image (i.e., the blurred image). The difference between the canvas image and the reference image (step 270 in FIG. 5) can be created in the following manner:

$$|(r_1,g_1,b_1)-(r_2,g_2,b_2)|=((r_1-r_2)^2+(g_1-g_2)^2+(b_1-b_2)^2)^{1/2},$$

where $r_1$, $g_1$, $b_1$ are color codes for the current grid point of the canvas image, and $r_2$, $g_2$, $b_2$ are color codes for the corresponding grid point of the reference image. The next grid location on the canvas image is determined in step 270. In step 280, if the current grid location is the last grid location. If so, the processor 50 returns the execution to step 170 as illustrated in FIG. 3. If not, the processor 50 determines an average of the differences between the colors in the neighboring pixels around the current grid location and the corresponding pixels on the reference image. If the averaged difference is greater than a threshold value (step 300), the processor 50 determines the neighboring grid location on the canvas image having a greatest difference value (step 310), makes a stroke normal to the gradient of the current grid location on the canvas image (step 320), and returns to step 270 to move to a next grid location. Otherwise, the process returns to step 270, without making the stroke. As described above, the threshold value may be changed.

To summarize, each grid point's neighboring grid points (of the canvas image) are compared with the reference image's corresponding grid points to find the nearby point with the greatest error value (e.g., difference value), and the brush stroke is painted at that grid point. An exemplary pseudocode is shown below:

```
procedure paintLayer(canvas, referenceImage, R)
{
    S := a new set of strokes, initially empty
    // create a pointwise difference image
    D := difference(canvas, referenceImage)
    grid := f_g R
    for x=0 to imageWidth stepsize grid do
        for y=0 to imageHeight stepsize grid do
            // sum the error near (x,y)
            M := the region (x-grid/2 . . . x+grid/2,
                    y-grid/2 . . . y+grid/2)
            areaError := D_{i,j}/ grid2
            if (areaError > T) then
            {
                // find the largest error point
                (x_1, y_1) := arg max D_{i,j}
                s :=makeStroke (R, x_i, y_i, referenceImage)
                add s to S
            }
        }
    paint all strokes in S on the canvas,
        in random order
}
```

Figure 4F:
FIG. 4(f) shows a digital image generated using an exemplary procedure which may place a circle of the brush radius using a color of the digital source image.
Figure 4G:
FIG. 4(g) shows another digital image generated using short brush strokes aligned to a normal direction of image gradients.

The procedure —"makeStroke()"—places a stroke on the canvas image beginning at $(x_1,y_1)$, which also accepts (as input) the reference image and the brush radius. $f_g$ is a constant grid size factor. FIG. 4(f) shows an image generated using the makeStroke() procedure which may place a circle of the brush radius at the grid location (x,y), using the color of the source image at location (x,y). FIG. 4(g) shows an image generated using short brush strokes, aligned to the normal direction of image gradients.

The method and system according to the present invention produces paintings that preferably focus viewer's attention to areas of the canvas image containing most of the details (e.g., high-frequency information) by placing many small brush strokes in these regions. Areas with small amount of detail are painted only with very large brush strokes. Thus, the strokes are appropriate to the level of detail in the source image. This choice of emphasis assumes that detail areas contain the most "important" visual information. Other choices of emphasis are also possible.

Placement of the Strokes

In one embodiment of the present invention, all strokes for each layer are planned (e.g., a data list stored in the storage device 80) before actually rendering (i.e., painting). Then, the strokes are rendered (e.g., displayed) in random order to prevent an undesirable appearance of regularity in the brush strokes.

In another embodiment of the present invention, a Z-buffer can be used to draw each stroke as soon as a stroke is created (i.e., without storing the strokes and then displaying them). Z-buffer is a computer graphics technique used for rendering 3D scenes. A Z-buffer is similar to a normal frame buffer which also stores an extra depth value (e.g., Z value) for each pixel (e.g., using the storage device 80).

Thus, hidden surfaces for 3D models can be eliminated because every pixel includes data regarding its depth. If a pixel in the Z-buffer is attempted to be overwritten, the depths of the pixels are first compared. The new pixel is only written in the Z-buffer if it has a smaller depth value than the depth value of the current pixel. An exemplary C-language code for the procedure described above is as follows:

```
void writePixel(int x, int y, int color, byte depth)
{
    if (zbuffer[x] [y].depth > depth)
    {
        zbuffer[x] [y].color = color;
        zbuffer[x] [y].depth = depth;
    }
}
```

In particular, for every grid location (e.g., a pixel) in the target image, a separate value (e.g., Z-value) is stored. Every Z value is initialized to 1 before each frame. A random value determined for the brush stroke (e.g., an R-value) is assigned a random number between 0 and 1. To paint a brush stroke, all of the pixels in the brush stroke are analyzed using the following procedure:

If the Z-value for a current pixel in the image is less than the R-value, nothing is done.

If the Z-value for the current pixel is greater than or equal to the R-value, then composite the strokes color over the current pixel, and set the Z-value for the current pixel to be equal to the R-value for the current pixel.

Creating Long Curved Brush Strokes

Individual brush strokes in a painting can convey shape, texture, overlap, and a variety of other image features. In the exemplary embodiment according to the present invention, step 320 (FIG. 5) can be implemented to draw a long, curved brush stroke to generate, for example, a gesture, a curve of an object or a play of light on a surface may be illustrated. The method and system according to the present invention enable a use of long curved brush strokes for painting long and continuous curves. In particular, these strokes of constant thickness are painted (i.e., generated) to approximate the colors of the reference image. The long curved brush strokes are provided as anti-aliased cubic B-splines, and each may include a predetermined color and opacity. Each stroke is rendered by dragging a circular brush mask along the sweep of the spline. In an exemplary embodiment of the present invention, the long curved brush strokes have a constant color and use image gradients to guide a placement of a stroke placement in a direction normal to the gradient of a particular image location. When the color of the stroke deviates from the color under the grid point of the reference image by more than a values of the current painting, the stroke ends at that control point. One can think of this as placing splines to roughly match the isocontours of the reference image.

Figure 6:
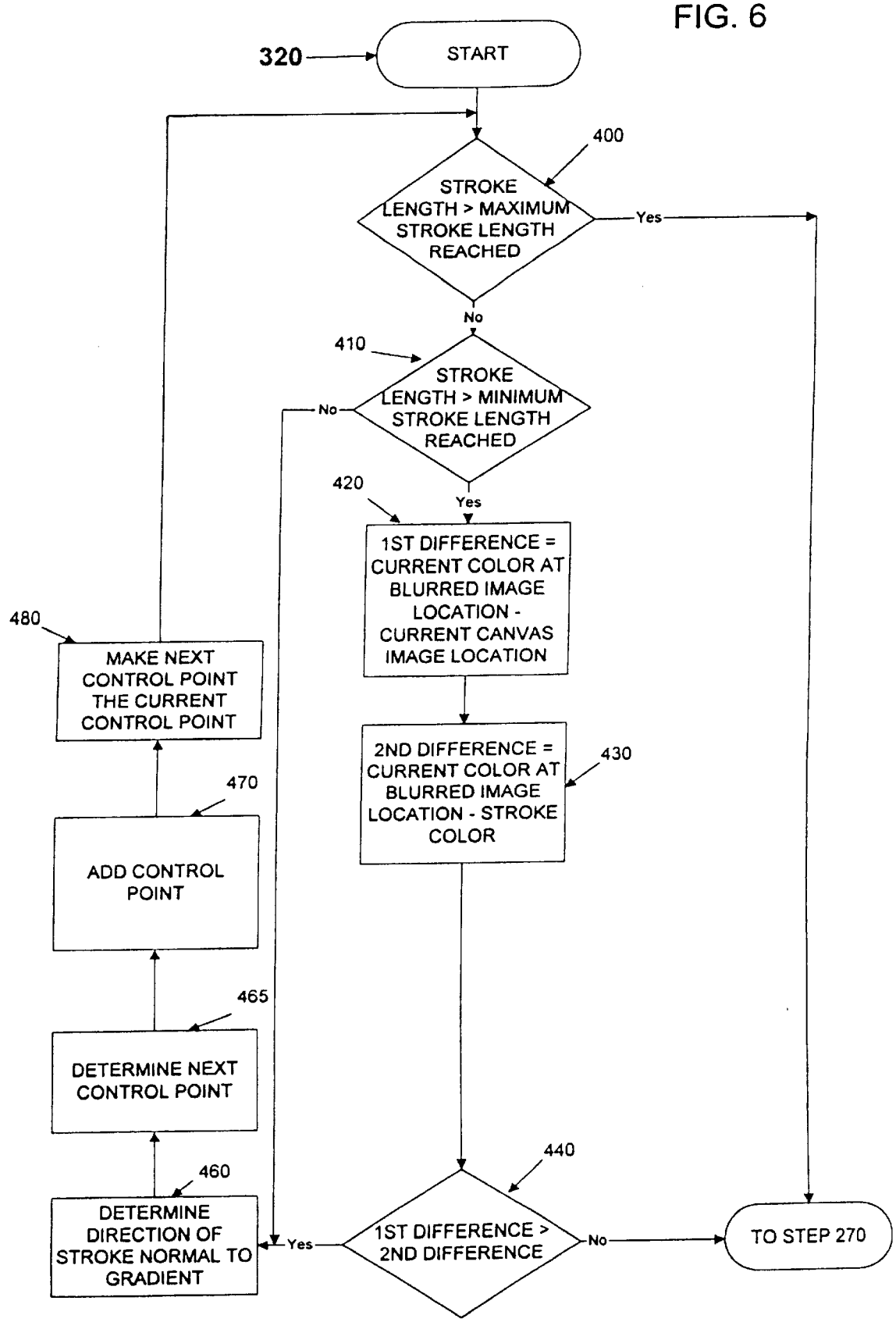
FIG. 6 shows a flowchart of an exemplary embodiment according to the present invention for generating a digital image using long curved brush strokes.

A flowchart of an exemplary embodiment according to the present invention to make long curved strokes is illustrated in FIG. 6. The long curved stroke placement algorithm begins at a given point in the image $(x_0,y_0)$, with a provided brush radius R. The control point $(x_0,y_0)$ is added to the spline, and the color of the reference image at $(x_0,y_0)$ is used as the color of the brush stroke. Additional control points are added by following the normals of the image gradient (as described below). The processor 50 then approximates the control points with a curved brush stroke. The brush stroke may be rendered with a cubic B-spline, with an anti-aliased circular mask drawn along the path of the curve, or using another conventional method.

In particular, in step 400, the processor 50 determines if the stroke length is greater than the maximum stroke length. If so, the process is returned to step 270 (shown in FIG. 5). If not, the processor 50 stops the stroke if the color of the stroke differs from the color under the last control point more than the reference image differs from the canvas image at that point. The processor 50, using steps 410–440, determines if the long curved stroke should be stopped. In particular, the processor 50 determines if the stroke length is greater than the minimum stroke length in step 410. (The minimum stroke length prevents the speckled appearance of very short strokes). If so, the processor 50 determines (in step 440) if the difference between the reference blurred image and the color of the stroke (step 420) is greater than the difference between the reference blurred image and the canvas image at the current grid location (step 430). If not, the process jumps to step 460, discussed below.

If either of steps 410 is answered in the negative or 440 is answered in the positive, the direction of the stroke (via control points) is determined in step 460, which is normal to the gradient of the corresponding grid location of the reference image. Then, in step 470, the control point is added to the stroke list (to determine the direction of the brush stroke), and the processor 50 prepares the brush to make the next brush stroke (step 480). Finally, the process returns to step 400.

Figure 7A:
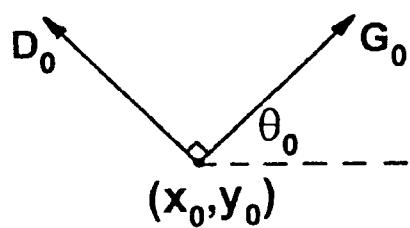
FIG. 7(a) shows an initial exemplary step in a procedure for applying long curved brush strokes on a canvas image.
Figure 7B:
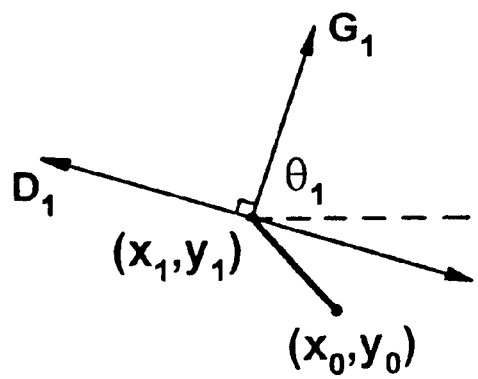
FIG. 7(b) shows a second exemplary step in the procedure for applying long curved brush strokes on a canvas image.
Figure 7C:
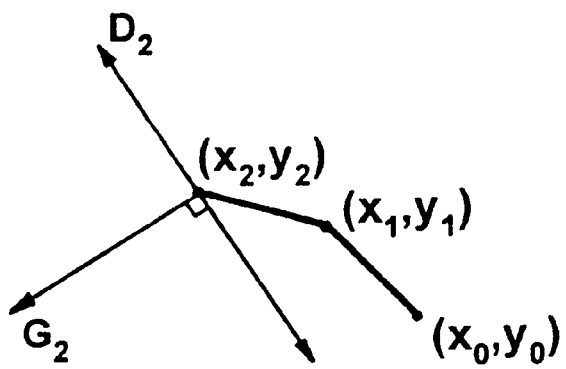
FIG. 7(c) shows a third exemplary step in the procedure for applying long curved brush strokes on a canvas image.

The procedure according to the present invention generates points shown in FIGS. 7(a)–7(c). In particular, the processor 50 starts from the first point $(x_0,y_0)$ (i.e., from the current grid location). The gradient $(\theta_0)$ for this point (i.e., the grid location) can be computed, for example, from the Sobel-filtered luminance of the reference image; using other methods to compute the gradient $(\theta_0)$ is also conceivable. The luminance of a pixel is computed as follows:

$$L(r,g,b)=0.30*r+0.59*g+0.11*b.$$

The next point $(x_1,y_1)$ is placed in the direction $(\theta_0+\pi/2)$ at a distance R from $(x_0,y_0)$, as illustrated in FIG. 7(a). The brush radius R is used as the distance between the grid locations because the brush radius R represents the level of preferred to be obtained using this brush size R. Accordingly, very large brushes create broad sketches of the canvas image, to be later refined with smaller radius brushes.

The remaining control points for the grid locations are computed by repeating the process according to the present invention (as shown in FIG. 6) by moving along the canvas image normal to the gradients and by placing control points. As provided in steps 400–450, the long curved stroke is terminated when (a) the predetermined maximum stroke length is reached, or (b) the color of the stroke differs from the color under the current grid location of the blurred reference image more than the color of the current grid point of the canvas image differs from the corresponding grid location of the blurred reference image, and that a minimum stroke length is reached. Thus, as shown in FIG. 7(b), the processor 50 computes a gradient direction $\theta_i$ at grid location $(x_i, y_i)$. Since there may be two normal directions, i.e., $\theta_i+\pi/2$, and $\theta_i-\pi/2$., the next direction chosen minimizes the stroke curvature. Direction $D_i$ is selected so that the angle between $D_i$ and $D_{i-1}$ is less than or equal to $\pi/2$. (See FIG. 7(b)). FIG. 7(c) illustrates further extensions of the long curved brush strokes.

The brush stroke curvatures can also be exaggerated or reduced by applying an infinite impulse response filter to the stroke directions. The filter can be controlled by a single predetermined filter constant —$f_c$. If the previous stroke direction is determined as follows:

$$D'_{i-1} = (dx'_{i-1}, dy'_{i-1}),$$

and the current stroke direction is determined as:

$$D_i = (dx_i, dy_i),$$

then the filtered stroke direction is:

$$\begin{aligned} D'_i &= f_c D_i + (1 - f_c) D'_{i-1} \\ &= (f_c dx_i + (1 - f_c) dx'_{i-1}, f_c dy_i + (1 - f_c) dy'_{i-1}). \end{aligned}$$

An exemplary pseudocode of the procedure shown in FIG. 6 is as follows:

```
function makeSplineStroke(x0, y0, R, refImage)
{
    strokeColor = refImage.color (x0, y0)
    K = a new stroke with radius R and color strokeColor
    add point (x0, y0) to K
    (x, y) := (x0, y0)
    (lastDx, lastDy) := (0, 0)
    for I=1 to maxStrokeLength do
    {
        if (I > minStrokeLength and
            |refImage.color(x, y) − canvas.color(x, y) |<
            |refImage.color(x, y) − strokeColor|) then
                return K
        // detect vanishing gradient
        if (refImage.gradientMag(x, y) == 0) then
            return K
        // get unit vector of gradient
        (gx, gy) := refImage.gradientDirection(x, y)
        // compute a normal direction
        (dx, dy) := (−gy, gx)
        // if necessary, reverse direction
        if (lastDx * dx + lastDy * dy < 0) then
            (dx,dy) := (−dx, −dy)
        // filter the stroke direction
        (dx, dy) := fc*(dx, dy) + (1 − fc)*(lastDx,lastDy)
        (dx, dy) := (dx, dy)/(dx² + dy²)½
        (x, y) := (x+R*dx, y+R*dy)
        (lastDx, lastDy) := (dx,dy)
        add the point (x, y) to K
    }
    return K
}
```

Rendering Styles

The method and system according to the present invention allows a graphic designer or artist to vary the computer's "artistic approach," instead of being forced to employ a single style of painting for every picture. It is preferable to use style parameters to control the rendering process and the brush strokes. These parameters enable the graphic artist to vary visual qualities of the painting (e.g., the canvas image). Some exemplary style parameters include stroke curvature and how closely the painting should approximate the original image (e.g., the source image). To be useful to a designer, the style parameters may provide the following properties:

Intuitiveness: Each style parameter should correspond to a visual quality of the painting. These qualities should be intuitive to the graphic artist without requirement or necessity of any technical computer knowledge.

Consistency: Styles should produce a substantially similar "visual character" for different images. For example, the graphic arctic may select a style based on a single frame of a video sequence, and then render the rest of the sequence in the same style.

Robustness: Each parameter should produce reasonable results over a predetermined range, without distorting the image for some values. A default value may be provided, so that extra parameters provide the user with more options without adding any extra burden. Increasing a parameter preferably increases or decrease some quality of the painting, rather than cause the generated painting output to fluctuate.

Independence: Style parameters can preferably be independent of one another. Changing line thicknesses, for example, should not necessarily affect the saturation of the canvas image.

Styles may be designed to imitate the styles of famous artists, or may represent other approaches to painting. Styles may also be collected into libraries (e.g., as records) to be later used by the graphic designers. Using the parameters described below, the designer may simply adjust the parameters appropriate to a particular application.

Exemplary Style Parameters

The following style parameters may be used for the method and system according to the present invention:

Approximation Threshold (T): Indicates how closely should the painting (i.e., the canvas image) approximate the source image. For example, higher values of the threshold T generate "rougher" images. This threshold value may be utilized in the method according to the present invention in step 300.

Brush Sizes (R): According to the present invention, it may be preferable to use, e.g., three parameters to specify brush sizes—Smallest brush radius ($R_1$), Number of Brushes (n), and Size Ratio ($R_{i+1}/R_i$). A limited range of brush sizes may provide results that may match the graphic designer's requirements for the painting, as well as render the painting quickly.

Curvature Filter ($f_c$): This parameter can be used to limit or exaggerate the stroke curvature.

Blur Factor ($f_o$): This parameter can control the size of the blurring kernel. A small blur factor allows more noise in the image, and thus produces a more "impressionistic" image.

Minimum/Maximum Stroke Lengths (minLength, maxLength): This parameter can be used to restrict the possible stroke lengths. Very short strokes may be used in a "pointillist" image, while long strokes may be used in a more "expressionistic" image.

Opacity ($\alpha$): This parameter specifies the paint opacity, e.g., between 0 and 1. Lower opacity may produce a wash-like effect.

Grid size ($f_g$): This parameter controls the spacing of brush strokes. The grid size times the brush radius ($f_g * R_i$) can provide the step size in the "paintLayer()" procedure.

Color Jitter: This parameter randomly adds jitter to hue ($j_h$), saturation ($j_s$), value ($j_v$), red ($j_r$), green ($j_g$) or blue ($j_b$) color components. A zero value may indicate no random jitter, while larger values increase the factor.

The threshold (T) can be defined in units of distance in color space. Brush sizes may be defined in units of distance. Sizes are specified in pixel units, although resolution-independent measures (such as inches or millimeters) can work equally well. Brush length can be measured using the number of control points. The remaining parameters are generally dimensionless.

Exemplary Utilization of Style Parameters

Figure 8A:
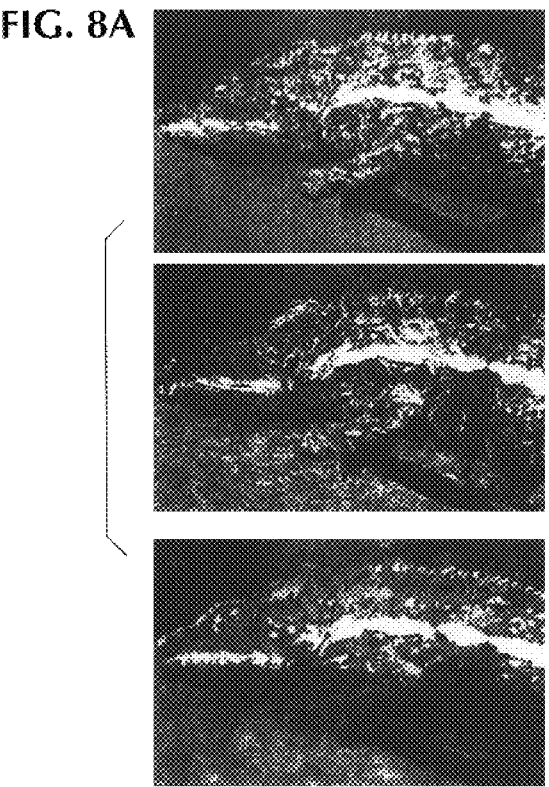
FIG. 8(a) shows a first exemplary image illustrating "Impressionist", "Expressionist" and "Colorist Wash" styles in a top to bottom order.
Figure 8B:
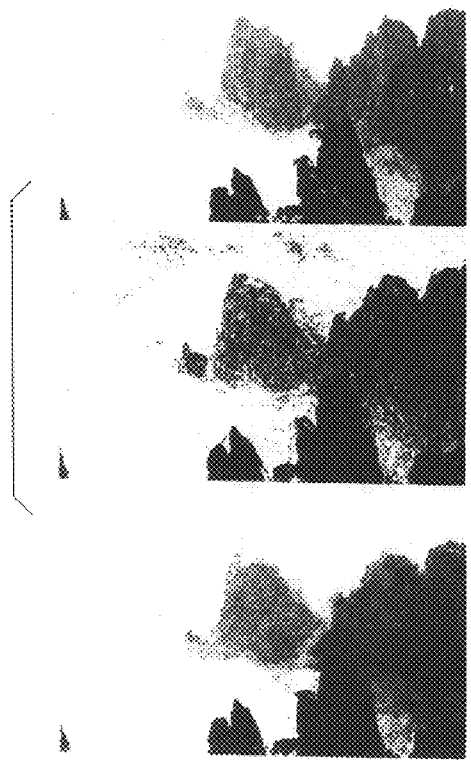
FIG. 8(b) shows a second exemplary image illustrating "Impressionist", "Expressionist" and "Colorist Wash" styles in a top to bottom order.
Figure 9A:
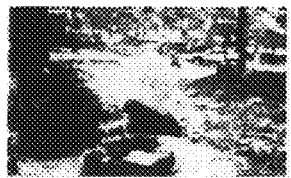
FIG. 9(a) shows a "Pointillist" style digital image.
Figure 9B:
FIG. 9(b) shows a digital image generated when style parameters of the images in FIG. 9(a) and in FIG. 9(c) (described below) are averaged.
Figure 9C:
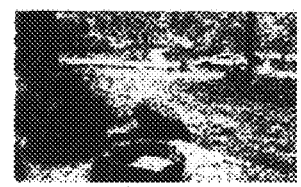
FIG. 9(c) shows a "Colorist Wash" style digital image.

FIGS. 8(a)–8(b) show the application of the first three of these styles (i.e., "Impressionist", "Expressionist" and "Colorist Wash" in a top to bottom order) to two different images. The distinct character of each style demonstrates the consistency of the method and system according to the present invention. FIGS. 9(a)–9(c) show a continuous transition between the "Pointillist" style and the "Colorist Wash" style. In particular, FIG. 9(a) shows a painting in the "Colorist Wash" style and FIG. 9(c) shows the same painting in the "Pointillist" style. When the parameters of FIGS. 9(a) and 9(c) are averaged, a new style shown in FIG. 9(b) is generated. By interpolating style parameter values, the visual character of rendering styles can be interpolated.

The exemplary styles are as follows:

Impressionist—A normal painting style, with no curvature filter and no random color. Exemplary style parameters are as follows: T=100, R=(8,4,2), $f_c$=1, $f_s$=0.5, a=1, $f_{g=}$1, minLength=4, maxLength=16.

Expressionist—Elongated brush strokes. Jitter is added to color value. Exemplary style parameters are as follows: T=50, R=(8,4,2), $f_c$=0.25, $f_s$=0.5, a=0.7, $f_g$=1, minLength=10, maxLength=16, $j_v$=0.5.

Colorist Wash—Loose, semi-transparent brush strokes. Random jitter is added to R, G, and B color components. T=200, R=(8,4,2), $f_c$=1, $f_s$=0.5, $a$=0.5, $f_g$=1, minLength=4, maxLength=16, $j_r$=$j_g$=$j_b$=0.3.

Pointillist—Densely-placed circles with random hue and saturation. Exemplary style parameters are as follows: T=100, R=(4,2), $f_c$=1, $f_s$=0.5, a=1, $f_g$=0.5, minLength=0, maxLength=0, $j_v$=1, $j_h$=0.3.

Another Exemplary Embodiment

The system and method according to the present invention can be used, e.g., in a Processing Video application. Some conventional methods for painting video sequences process each video frame separately, which produces a distracting 'flickering' effect. To reduce this effect, and to improve temporal coherence, the system and method according to the present invention begins each frame by painting over the last frame of the animation, instead of starting with a blank canvas each time. This embodiment according to the present invention is very simple to implement, and is fast to compute, since relatively few brush strokes are rendered for each frame.

An exemplary steps of the embodiment described above is as follows:

a. A first frame of the video is processed using the system and method according to the present invention as shown in FIGS. 3, 5 and 6.

b. Each remaining frame of the video is processed with using the embodiment of the present invention described herein. In this embodiment, the initial canvas is the painting from the previous frame, rather than a blank canvas (e.g., step 130 of FIG. 3 is replaced with a step that copies the result of the previous frame). Then, the painting procedure is executed, however all layers are treated the same. Thus, steps 210–250 of FIG. 5 are eliminated, and step 200 is always followed by step 260.

c. The results of each painted frame are then combined into a new video sequence.

As such, this embodiment of the system and method according to the present invention can be equated to "painting" a movie by painting the first frame, then painting over the first frame to produce the second frame, etc.

Other Embodiments

While the present invention has been particularly shown and described with reference to exemplary embodiments thereof, it will be understood by those skilled in the art that various changes in form and details may be made therein without departing from the spirit and scope of the invention. For example, it possible to utilize the system and method according to the present invention for animating a feature-length movie in a watercolor or oil painting style. Non-photo realistic rendering can also be used to create attractive and expressive images for graphic design and illustration.

Furthermore, it is possible to modify the "makeLayer" procedure as shown in FIG. 5 to place the strokes in a different order. In addition, it is conceivable to modify the "makeSplineStroke()" procedure shown in FIG. 6 to place curved strokes differently. The brush stroke model may also include stroke thickness, tapering, stroke texture, tension, etc.

What is claimed is:

1. A method for generating a digital finalized image having a hand-painted appearance on a digital canvas image using a computer system, the method comprising the steps of:

(a) receiving a digital source image;

(b) blurring the source image to generate a digital reference image;

(c) receiving brush size data, the brush size data including a first record corresponding to a first size of a brush and a second record corresponding to a second size of the brush, the first size being different from the second size;

(d) with the first record for the brush, applying brush strokes to the canvas image using the reference image; and (e) with the second record for the brush and after step (d), applying the brush strokes to the canvas image using the reference and canvas images.

2. The method according to claim 1, further comprising the step of:

(f) displaying the canvas image on a display device.

3. The method according to claim 1, further comprising the step of:

(f) storing the canvas image using in a storage device.

4. The method according to claim 1, wherein the first size of the brush is greater than the second size of the brush.

5. The method according to claim 4, wherein the brush size data includes a third record corresponding to a third size of the brush, the third size being smaller than the second size, and further comprising the step of:

(g) with the third record for the brush and after step (e), applying the brush strokes to the canvas image using the reference and canvas images.

6. The method according to claim 1, wherein step (d) includes the substeps of:

(i) overlaying a grid over the canvas image to generate grid locations, and (ii) applying the brush strokes in a current location of the grid locations.

7. The method according to claim 6, wherein the brush strokes are applied in a direction being normal to a gradient of the current location.

8. The method according to claim 1, wherein step (e) includes the substeps of:

(i) overlaying a grid over the canvas image to generate grid locations, (ii) comparing the canvas image and the reference image to generate difference values for each of the grid locations, (iii) averaging the difference values of the difference locations around a current location to generate an averaged value, (iv) determining a further location having a highest difference value, and (v) applying the brush strokes in the further location if the averaged value is greater than a threshold value.

9. The method according to claim 8, wherein the brush strokes are applied in a direction being normal to a gradient of the further location.

10. The method according to claim 8, wherein the substep (v) includes the substeps of:
- (v1) determining a first difference between a color of the reference image at the further location and a current color of the canvas image at the further location,
- (v2) determining a second difference between a first color of the corresponding location and a second color of the brush stroke, and
- (v3) continuing a curved brush stroke having a stroke length to another location on the canvas image if one of:
  - the stroke length is smaller than a maximum stroke length, and
  - the stroke length is larger than a minimum stroke length and the first difference is greater than the second difference.

11. The method according to claim 10, wherein the substep (v) further includes the substep of:
- (v4) filtering a curvature of the curved brush stroke.

12. The method according to claim 1, further comprising the step of:
- (g) receiving style data, wherein the brush strokes are applied to the canvas image using the style data.

13. The method according to claim 1, wherein step (d) includes the substep of:
- storing each of the brush strokes in a list.

14. The method according to claim 1, wherein step (e) includes the substep of:
- storing each of the brush strokes in a list.

15. A system for generating a digital image having a hand-painted appearance on a canvas image, comprising:
- a device providing a source image and brush size data; and
- a processor blurring the source image to generate a reference image and receiving the brush size data, the brush size data including a first record corresponding to a first size of a brush and a second record corresponding to a second size of the brush, the first size being different from the second size,
- wherein the processor, with the first record for the brush, applies brush strokes to the canvas image using the reference image to generate a working image, and
- wherein the processor, with the second record for the brush, applies the brush strokes to the working image using the reference and working images to generate a finalized image.

16. The system according to claim 15, further comprising:
a display device displaying the finalized image.

17. The system according to claim 15, further comprising:
a storage device storing the finalized image.

18. The system according to claim 15, wherein the first size of the brush is greater than the second size of the brush.

19. The system according to claim 18, wherein the brush size data includes a third record corresponding to a third size of the brush, the third size being smaller than the second size, and wherein the processor, with the third record for the brush, applies the brush strokes to the finalized image using the reference and finalized images to generate a final image.

20. The system according to claim 15, wherein the processor applies the brush strokes to the canvas image by overlaying a grid over the canvas image to generate grid locations, and by applying the brush strokes in a current location of the grid locations.

21. The system according to claim 20, wherein the brush strokes are applied in a direction being normal to a gradient of the current location.

22. The system according to claim 15, wherein the processor applies the brush strokes over the working image by:
- (a) overlaying a grid over the finalized image to generate grid locations,
- (b) comparing the finalized image and the reference image to generate difference values for each of the grid locations,
- (c) averaging the difference values of the difference locations around a current location to generate an averaged value,
- (d) determining a further location having a highest difference value,
- (e) generating control points in the further location if the averaged value is greater than a threshold value;
- (f) connecting the control points to form the brush strokes.

23. The system according to claim 22, wherein the brush strokes are applied in a direction being normal to a gradient of the further location.

24. The system according to claim 22, wherein the processor applies the brush stroke in the further location by:
- (a) determining a first difference between the further location and a corresponding location on the reference image,
- (b) determining a second difference between a first color of the corresponding location and a second color of the brush strokes, and
- (c) continuing a curved brush stroke having a stroke length to the further location on the finalized image if one of:
  - the stroke length is smaller than a maximum stroke length, and
  - the stroke length is larger than a minimum stroke length and the first difference is greater than the second difference.

25. The system according to claim 24, wherein the processor applies the brush stroke in the further location by:
- (d) filtering a curvature of the curved brush stroke.

26. The system according to claim 24, wherein the brush strokes are applied to the canvas image using the style data.

27. The system according to claim 15, wherein the processor applies the brush strokes over the canvas image by:
storing each of the brush strokes in a list.

28. The system according to claim 15, wherein the processor applies the brush strokes over the working image by:
storing each of the brush strokes in a list.

* * * * *